Feb. 28, 1961     E. P. O. BOOTH     2,973,083
BELT CONVEYOR SUPPORTING MEANS
Filed Dec. 10, 1958
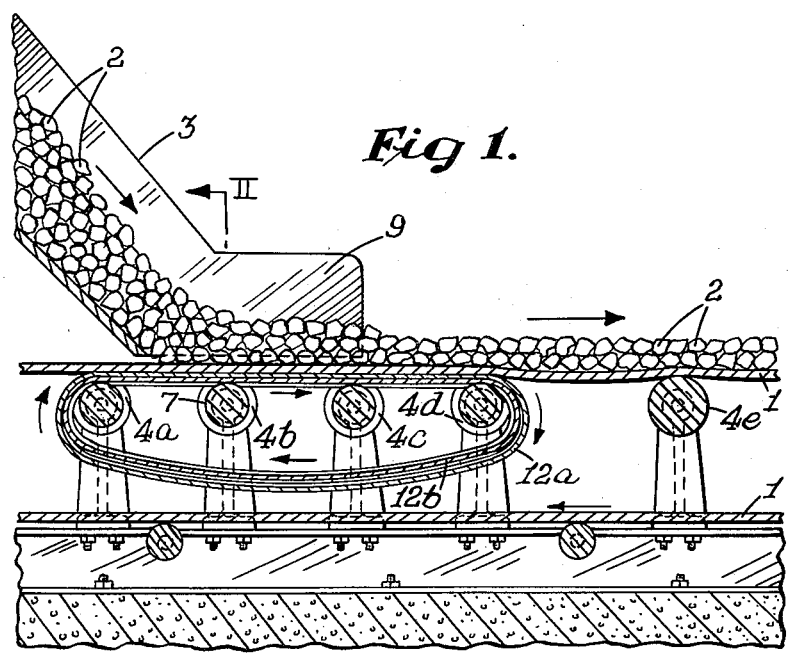
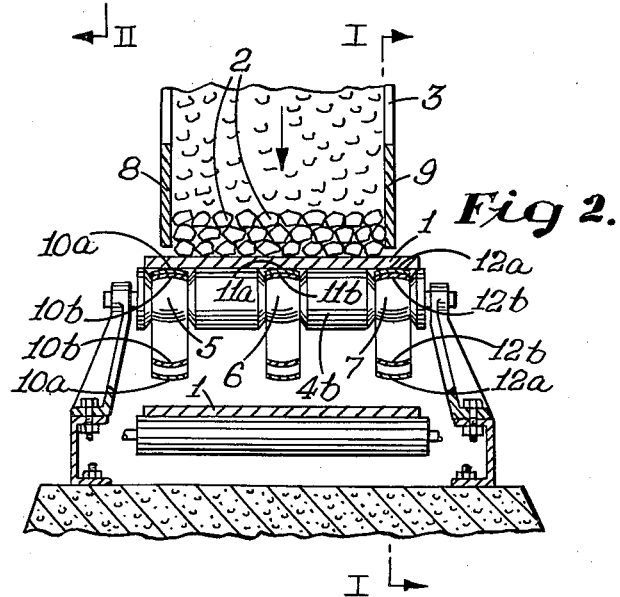

United States Patent Office 2,973,083
Patented Feb. 28, 1961

2,973,083

BELT CONVEYOR SUPPORTING MEANS

Edmond Percival Otto Booth, % Edward L. Bateman Limited, Founders Bldg., 34 Ameshoff St., Braamfontein, Johannesburg, Transvaal, Union of South Africa Filed Dec. 10, 1958, Ser. No. 779,316

Claims priority, application Union of South Africa Dec. 30, 1957

1 Claim. (Cl. 198—184)

This invention relates to belt conveyors.

Along its path of forward travel a conveyor belt has a tendency to sag longitudinally between adjacent transverse idler rollers when loaded. It is commonly experienced that the material which is fed onto the belt becomes jammed between the side walls of the feeder hopper and the sagging portions of the belt, with the result that the belt is often cut and badly damaged.

It is an object of the present invention to provide means for minimizing the above disadvantage.

In accordance with the invention there is provided a belt conveyor in which at least one auxiliary belt is interposed longitudinally between the main belt along its path of forward travel and the transverse support rollers therefor at least longitudinally co-extensive with the side walls of the feeder hopper of the conveyor to provide support at or near the sides of the main belt; the auxiliary belt comprising a supporting strip of sheet metal of substantially concave-convex cross-section which, when supported between longitudinally spaced points, is not easily deformable by a load applied to the convex surface thereof but is deformed readily when a load is applied from the opposite direction to the concave surface thereof, and which is disposed with its convex surface in supporting contact with the main belt; the auxiliary belt further being movable longitudinally relative to the support rollers through frictional engagement with the main belt and/or through engagement with a driver roller.

An auxiliary belt may be provided at or near each side of the main belt.

At least one additional auxiliary belt may be provided intermediate the two auxiliary belts located at or near the sides of the main belt, to provide added support.

The support rollers associated with the auxiliary belt(s) may be provided with complementary shaped peripheral portions for engagement with the concave surface(s) of the auxiliary belt(s).

Two or more auxiliary belts may be arranged on top of one another with the opposite surfaces of adjacent auxiliary belts in complementary relationship.

The auxiliary belt(s) may be made of spring steel.

A preferred embodiment of the invention will now be described, purely by way of example, with reference to the accompanying drawings in which:

Figure 1 is a longitudinal sectional view on the line I—I in Figure 2, of a continuous belt conveyor according to the invention.

Figure 2 is a section on the line II—II in Figure 1.

Continuous main belt 1 conveying material 2 which is fed from hopper 3 is supported along its path of forward travel by transverse idler rollers 4a, 4b . . . 4e. Idler rollers 4a, 4b, 4c, 4d located underneath and immediately behind and in front of the mouth of feeder hopper 3 are each provided along its length with three convex peripheral grooves, such as 5, 6, 7. The two outer grooves 5 and 7 are located underneath the side walls 8 and 9 respectively of feeder hopper 3 and towards the sides of main belt 1. Inner groove 6 is located intermediate the sides of main belt 1.

Three pairs of continuous auxiliary belts 10a and 10b; 11a and 11b; 12a and 12b are interposed longitudinally along their path of forward travel between main belt 1 and the grooved idler rollers 4a, 4b, 4c and 4d. Each auxiliary belt is made of spring steel, has a concave-convex cross-section and is arranged with its concave surface disposed inwardly. Each auxiliary belt is so arranged that when it is supported between longitudinally spaced points, it is not easily deformable by a load applied to the convex surface thereof but is deformed readily when a load is applied from the opposite direction to the concave surface thereof.

Each pair of auxiliary belts is arranged as shown so that along their path of forward travel the one lies on top of the other with the convex surface of the lower belt adjacent the concave surface of the upper belt. The convex surfaces of the upper auxiliary belts 10a, 11a, 12a are in supporting contact with main belt 1 and the concave surfaces of the lower auxiliary belts 10b, 11b, 12b are, in turn, supported in the convex peripheral grooves, such as 5, 6, 7 respectively. Whereas the auxiliary belts are located underneath main belt 1 along the path of forward travel, the auxiliary belts are located above main belt 1 along the return path of travel in any convenient position.

In operation, main belt 1 is supported along its side and middle portions on the auxiliary belts over the longitudinal region stretching from a short distance behind, to a short distance in front of, the side walls 8 and 9 of feed hopper 3 which are located adjacent main belt 1. Over the remainder of its length main belt 1 is supported by the idler rollers 4e . . . etc. in the normal manner. The main belt 1 is further driven in the usual manner through frictional engagement with one or more driver rollers which are not shown. The auxiliary belts, in turn, are moved longitudinally relative to the idler rollers, 4a, 4b, 4c, 4d, through frictional engagement with the main belt.

The auxiliary belts do not sag readily under the load of the main belt applied to their convex surfaces, but can be made continuous by turning them back upon themselves with the convex surfaces disposed inwardly.

Instead of providing the auxiliary belts in pairs, they may be provided singly. The reason for arranging two auxiliary belts on top of each other, is that the supporting strength can be increased without affecting the flexibility which permits the formation of continuous belts.

The auxiliary belts minimize the sag of main belt 1 over the region occupied by the mouth of feeder hopper 3. This obviously minimizes the possibility of the material 2 which is fed on to the conveyor becoming jammed between main belt 1 and side walls 8 and 9 of feeder hopper 3.

The auxiliary belts should at least be longitudinally co-extensive with side walls 8 and 9 of feeder hopper 3 along the path of forward travel, but may, in addition, extend further over the remainder of the path of forward travel of main belt 1. The auxiliary belts may also be arranged to be moved longitudinally through engagement with a driver roller.

The inner pair of auxiliary belts 11a and 11b may be omitted altogether so that the main belt 1 is only supported along its sides.

It will be appreciated that the auxiliary supporting belts provided by the invention can also be used with a conveyor in which the main belt is supported to form a trough along its path of forward travel.

I claim:

An auxiliary supporting means for a concentrated weight-carrying area of an endless belt conveyor, said conveyor being supported on spaced rollers and having upper and lower runs said auxiliary supporting means comprising an endless sheet steel belt extending for the length of said concentrated weight-carrying area and having in cross section convex and concave sides with the convex side outermost, said steel belt being non-sagable and resistant to a force normal to said convex side until deformed straight, auxiliary rollers mounted to movably support said auxiliary steel belt between the upper and lower runs of said conveyor belt and with the convex side of the steel belt in contact and movable with the upper run of said conveyor belt, said auxiliary rollers having convex surfaces to mate with the concave inner side of said auxiliary steel belt which is thereby prevented from deforming straight by said convex rollers, whereby said auxiliary supporting means provides uniform continuous support for the normally applied load of the endless conveyor belt along the length of the auxiliary steel belt in contact and moving with said conveyor belt.

References Cited in the file of this patent

UNITED STATES PATENTS

| | | |
|---|---|---|
| 2,308,872 | Foster | Jan. 19, 1943 |
| 2,490,439 | Hughes | Dec. 6, 1949 |
| 2,850,148 | Rasmusson | Sept. 2, 1958 |

FOREIGN PATENTS

| | | |
|---|---|---|
| 444,099 | Germany | May 11, 1927 |
| 956,926 | Germany | Jan. 24, 1957 |